United States Patent [19]

Jenkins et al.

[11] Patent Number: 4,970,489

[45] Date of Patent: Nov. 13, 1990

[54] OCCUPANCY SIMULATOR FOR HOME SECURITY

[76] Inventors: Harry D. Jenkins, 142 Chillingham Rd., Irmo, S.C. 29063; Harry D. Jenkins, 1311 Country Squire Dr., Columbia, S.C. 29212

[21] Appl. No.: 461,622

[22] Filed: Jan. 8, 1990

[51] Int. Cl.⁵ .......................... G08B 1/00; G08B 13/08
[52] U.S. Cl. ................................ 340/309.15; 340/573; 340/546; 340/555; 340/691; 340/692; 340/724; 340/815.08; 40/414; 40/421; 40/423
[58] Field of Search ............ 340/309.15, 573, 546, 340/555, 691, 692, 724–726, 815.08, 815.17, 815.18; 40/411, 414–420, 421, 423, 436, 442, 443

[56] References Cited

U.S. PATENT DOCUMENTS 4,689,616  8/1987  Goude et al. ................. 340/725

Primary Examiner—Donnie L. Crosland

[57] ABSTRACT

An occupancy simulator for casting shadows on the walls of a room, the simulator having a lamp, a shutter for casting the shadow by passing through the lamp's light beam, a motor for driving the shutter, and a microprocessor for controlling the operation of both shutter and lamp so that the shadow moves first in one direction and then, after a delay, in the reverse direction in its base mode of operation. The microprocessor can be programmed to start and stop the base mode, to modify the base mode and to cycle through the base mode in response to an external signal such as from a home security system. Several occupancy simulators can be electrically tied into a supervising unit of a home security system to cycle one or more occupancy simulators in sequence through the base mode upon receiving a signal that one of the detectors of the home security system has been tripped.

16 Claims, 3 Drawing Sheets

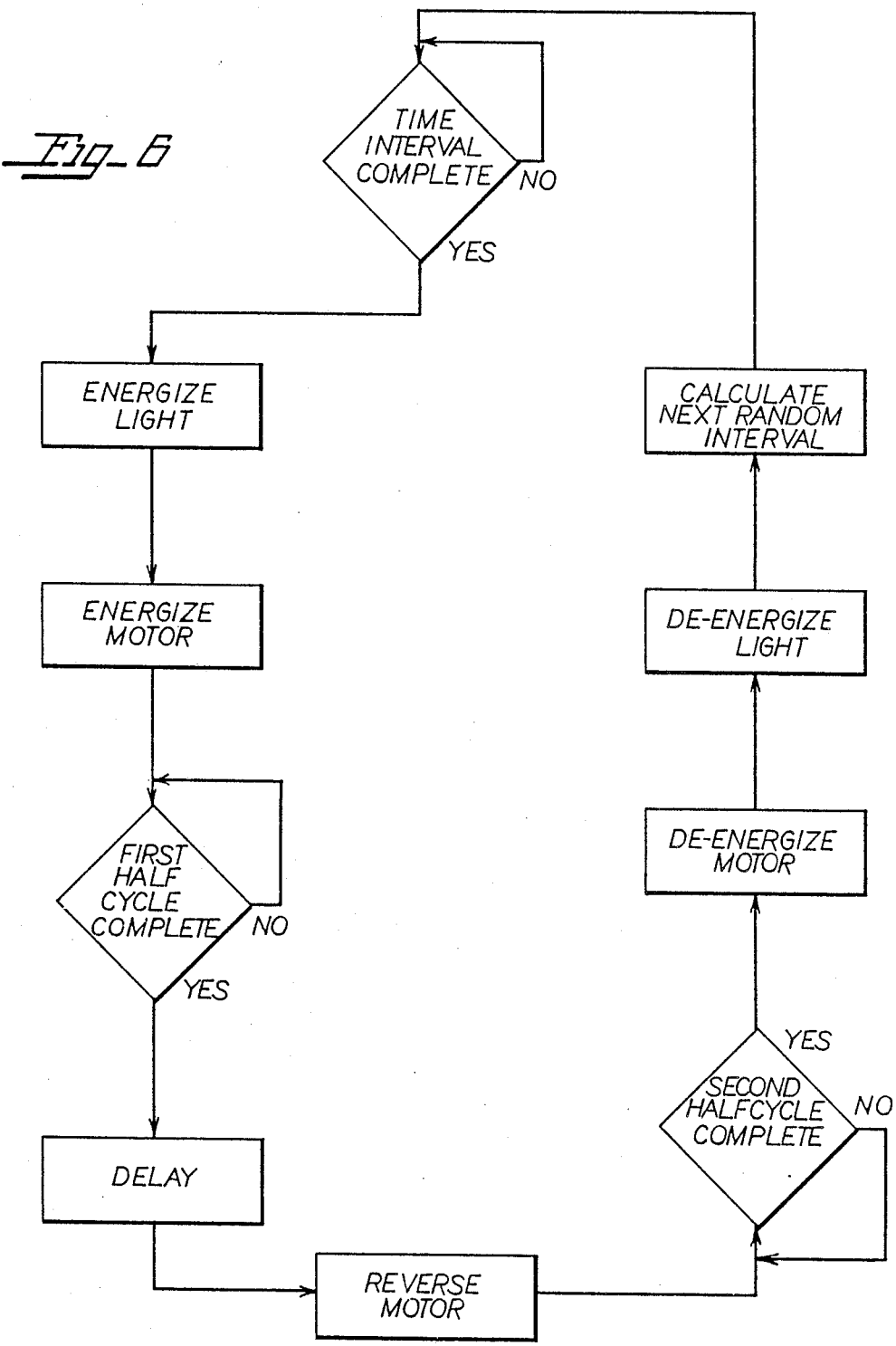

OCCUPANCY SIMULATOR FOR HOME SECURITY

BACKGROUND OF THE INVENTION

1. Field of the Invention

The present invention relates to home security devises. More specifically, the present invention relates to occupancy simulators for deterring burglary.

2. Discussion of Background

The physical security of people in their homes is of paramount importance. Locking doors and windows is a well known practice for increasing physical security of a home. Leaving interior or exterior lights on is another well known method for reducing the likelihood of a burglary. Many people feel sufficiently threatened by the possibility of burglary that they keep guns or other weapons to defend themselves and their property against intruders. To warn themselves that an intruder is lurking about, people may place reliance on devices ranging in sophistication from watchdogs to a home electronic security system having a variety of detectors which, when tripped by breaking a window or by opening of a door, touch off a siren. Usually, the barking of the dog or the wailing of the siren will alert not only the occupants but also the intruder and thereby deter the would-be burglar.

There are some devices that simulate an occupied home by sounds and shadows, sometimes tied to detectors at doors or widows. This approach may have the advantage of preventing an attempted burglary for it is believed that a burglar will not enter a house known to be occupied. See for example, U.S. Pat. Nos. 4,577,183 issued to Fontaine, et al., 4,571,583 issued to Giordano, 4,212,007 issued to Reyes, et al., and 3,750,132 issued to Natter. The Natter device in particular, creates shadows in several rooms by using a set of cams to activate various appliances including radios and lamps. The lamps are fitted with revolving shadow casting devices.

These devices all have shortcomings. An occupancy simulator that simulates a routine too repeatedly can ironically become an announcement that the home is in fact not occupied because human behavior patterns vary. A simulator that is not true to the habits of the occupants may also be a tip off that the house is unoccupied. Finally, with the increase in the number of homes with security systems of one sort or another, an occupancy simulator that does not interface with the system is simply underutilized.

There is a need for a realistic, programmable, occupancy simulator that can be interconnected electrically with a home security system.

SUMMARY OF THE INVENTION

In accordance with its major aspects, the present invention is an occupancy simulator for use in a room, the simulator having a lamp for casting a beam of light, a shutter in front of the lamp for interrupting the light beam, and a microprocessor directing the lamp and the shutter in a base mode of operation wherein the shutter interrupts the light beam by passing through the light beam first in one direction and then the reverse direction after a delay so that a shadow is cast on the walls of the room that moves in the first direction then the reverse direction. The microprocessor of the occupancy simulator is programmable and has a memory so that additional modes can be accommodated. Simulated voice can be added to the occupancy simulator unit.

Additional units can be interconnected so that a shadow traverses, say, the living room first; then a light goes on in another room such as the kitchen and a shadow traverses that room; a delay follows; then the shadow traverses the kitchen in the reverse direction, then the shadow traverses the living room in the reverse direction. The simulator can interface with the home security system so that a noise can initiate a base mode cycle of operation in, say, the bedroom followed by the hallway and the living room.

A feature of the present invention is the changing of the direction of shadow movement. Occupants of a house do not move in the same direction when moving in a room hut change directions. There is a back and forth characteristic to the movement of people in a house. They go to the kitchen or the bathroom from the living room, to the dining room from the kitchen and hack, to the kitchen from the bedroom and back. This characteristic movement is realistically simulated by a steady traversing of the shadow in one direction and then returning in a reverse direction.

Another feature of the present invention is programmability to increase flexibility. Simulation of occupancy requires flexibility in creating a varying pattern. Interior lights are not turned on and off at the same time every day of the year and voices are not heard at the same time every evening in an occupied house. Greater realism in the patterns permitted by the present invention is a better deterrent to burglary.

Still another feature of the present invention is the built-in delay between the reverse direction traverse. This delay, in addition to allowing realism, permits nesting of simulators: a first unit proceeds through the first half of the cycle, a second begins, then a third, and so on, with the last completing the cycle first and the first last.

An additional feature of the present invention is its flexibility in interfacing with home security systems for a simulated "response" to an intrusion alarm in the form a signal from one of the detectors of a home security system.

These and other features and advantages of the present invention will be apparent to those skilled in the art of occupancy simulators and home security systems from a careful reading of the following detailed description and related drawings.

BRIEF DESCRIPTION OF THE DRAWINGS

In the drawings:

FIG. 6 is a flow chart showing the base mode of operation of the occupancy simulator unit according to the present invention.

DETAILED DESCRIPTION OF A PREFERRED EMBODIMENT

The present invention is an occupancy simulator system to be used to enhance home security by casting shadows on the walls of rooms of home in directions, at speeds, and in ways designed to simulate realistically the movements of human occupants of the home and thereby discourage attempts to burglarize the home. The system is comprised of one or more than one unit 10 and, if more than one, preferably tied to and supervised by a home security system having a plurality of detectors for sensing the opening of doors and windows, and the like.

Figures 1, 2:
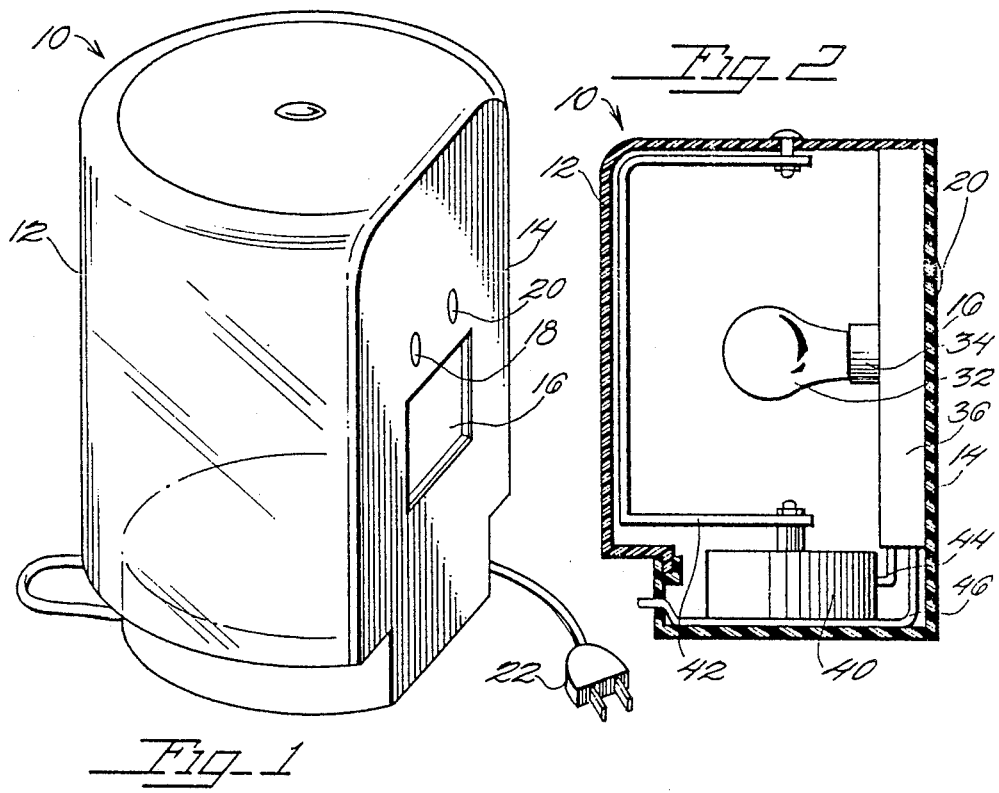
FIG. 1 is a perspective view of the occupancy simulator unit according to the present invention.
FIG. 2 is a side cross sectional view of the occupancy simulator unit according to the present invention.

The occupancy system of the present invention begins with an individual unit 10, depicted in FIG. 1, having a generally cylindrical shell 12 with a flattened side 14 on the front. Unit 10 is preferably about 10 centimeters in diameter and about 15 centimeters tall. Flattened side 14 has a display 16 of the time of day in digital form and one or more buttons for inputting information, such as a "SET/RESET" button 18 and an "ADVANCE" button 20. Pushing SET/RESET button selects the type of input and informs unit 10 that it is about to receive input of that type; ADVANCE button provides that input. Power for operating unit 10 is provided by connecting a standard plug 22 into a wall socket delivering 110-120 volt AC or, alternatively, a connection can be provided for an AC/DC adaptor. In addition, backup power may be supplied by batteries.

In FIG. 2 the interior of unit 10 is shown. Shell 12 is translucent so that a beam of light from a lamp 32 can pass therethrough. Lamp 32, preferably a bright, low power lamp such as a 12 volt DC halogen lamp, is mounted in a lamp socket 34 which is attached to a panel 36 behind flattened side 14. Panel 36 is preferably opaque. Also inside shell 12 is a drive motor 40 for driving a shutter 42. Shutter 42 interrupts a light beam radiating from lamp 32 through shell 12. Panel 36 is connected to motor 40 by a first wire 44 and to power source by a second wire 46 which leads to plug 22 (FIG. 1).

Within panel 36 is circuitry for controlling lamp 32, drive motor 40 and shutter 42 which circuitry will be described in more detail below.

Figure 3:
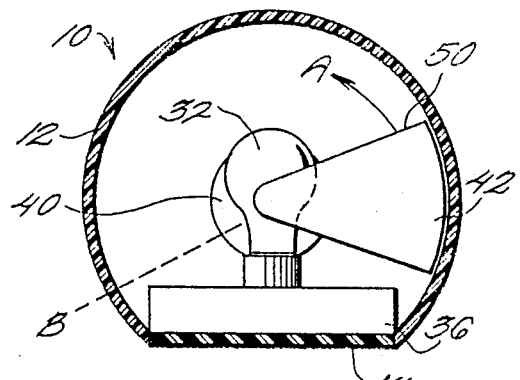
FIG. 3 is a top cross sectional view of the occupancy simulator unit according to the present invention.

FIG. 3 shows a cross sectional view of an occupancy simulator from the top. Shutter 42 is moved in a first direction A, shown in FIG. 3 as counter clockwise, until its leading edge 50 is at position B. Then shutter 42 moves in the reverse direction, clockwise here, to its original position. The movement of the shutter in a first direction and then a different direction, here in the present, preferred embodiment, a reverse direction, is the base mode of the occupancy simulator unit 10. It is believed that people move, more often than not, in a rhythm in their homes: between a chair and a television and back to the chair, between a living room and a kitchen and back, between a living room and a bathroom and back, and so on. The rhythm of this movement is imitated by a mode having two parts to its cycle with a different movement associated with each part. The circuitry in panel 36, as will be described below, introduces a delay between the initial and reverse movements of shutter 42 to add further realism to the base mode.

Figure 4:
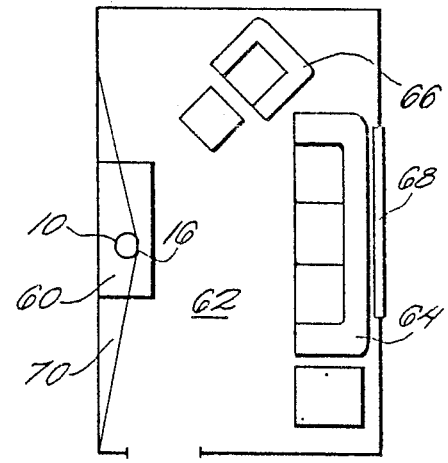
FIG. 4 is a diagram of a room of a house showing a placement of the occupancy simulator unit according to the present invention.

Placement of occupancy unit 10 is important but made simple by its design. Unit 10 is small and unobtrusive and, as illustrated in FIG. 4, can be conveniently placed on a television console 60 in a room 62 having a sofa 64 and chair 66 with a window 68 behind sofa 64. The opaque flattened side 14 with its display 16 normally indicating the time of day faces occupants who are turned toward television console 60. The shadow cast by unit 10 when shutter 42 interrupts the beam of light from lamp 32, moves across wall 70 and back at intervals to simulate the movement of the occupants of room 62 whether they are present or not. From outside window 68 at a distance, the source of the light on wall 70 cannot be determined and a would be burglar would assume it was from a lamp in room 62. Unit 10 should be positioned in a room where the shadows it casts traverse walls opposite the windows of the room and where simulator unit 10, if it can be seen from the window, has its flattened side 14 forward.

Figure 5:
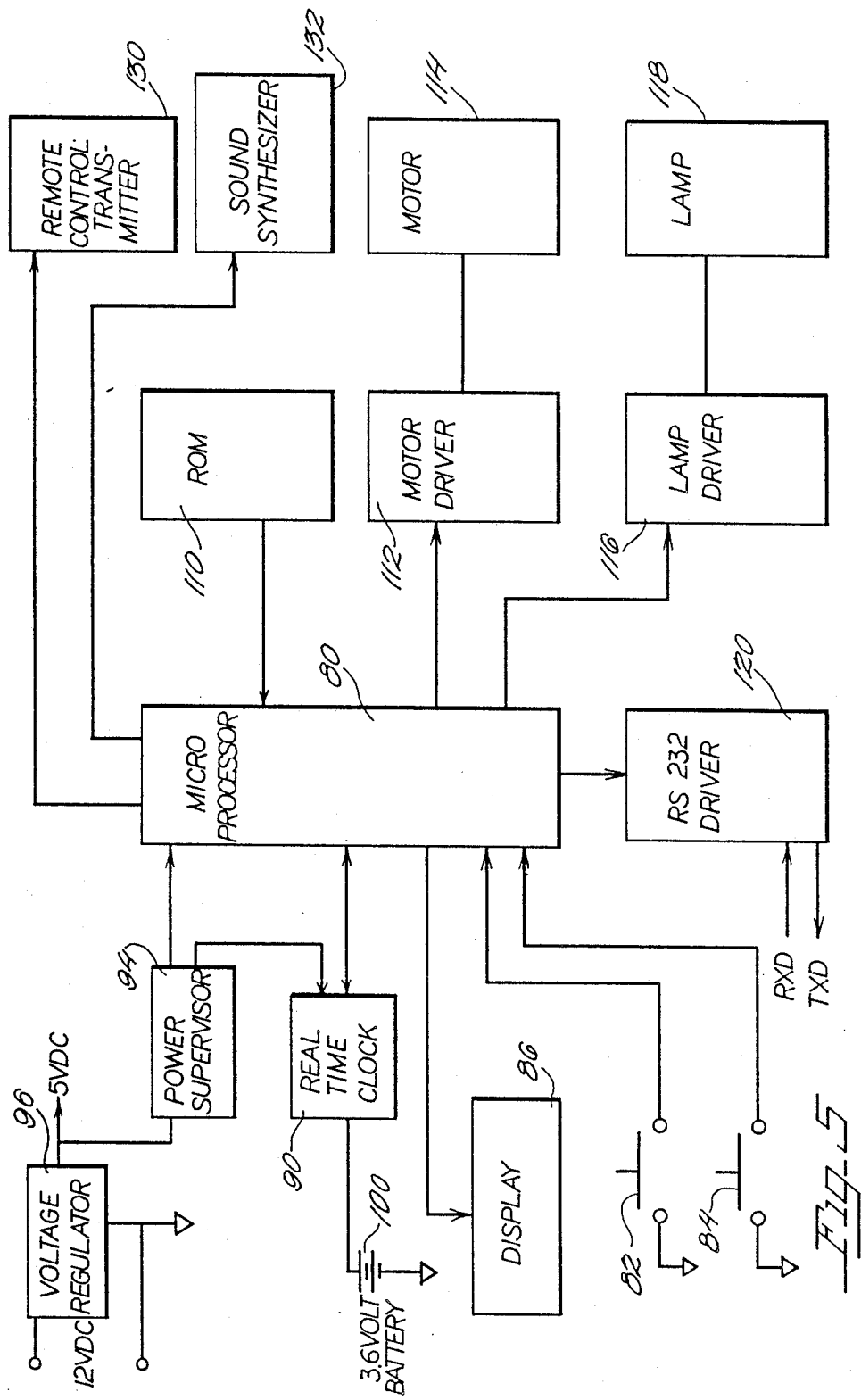
FIG. 5 is a schematic view of the circuitry of the occupancy simulator unit according to the present invention.

The schematic of FIG. 5 shows the circuitry in or connected to Panel 36. The heart of this circuitry is a programmable microprocessor 80, such as an 80C318, made by several manufacturers, which can receive input from SET/RESET and ADVANCE buttons 82, 84, respectively. Microprocessor 80 transmits information to display 86, preferably an LED display showing information such as real time except when input is being received by microprocessor 80. A realtime clock 90, such as an MC146818, also made by several manufacturers, provides the actual time for microprocessor 80 to transmit to display 86 and also to a power supervisor 94 for turning on the power to microprocessor 80 when activating unit 10 according to a programmed schedule. A voltage regulator 96 connected on one side to a source of direct current voltage of approximately 12 VDC and on the other side providing 5 volt DC output for circuit requirements and power to a power supervisor 94, such as a MAX691 manufactured by MAXIM Power supervisor 94 monitors power and provides a reset for microprocessor 80.

Backing up, or alternative to, the household power supply to real time clock 90 is a battery 100, preferably 3.6 volts DC so that momentary or longer interruptions of the power supply to the house do not result in a loss of the programming of microprocessor 80.

For storing programming directions, microprocessor 80 is connected to a read-only memory (ROM) 110 sized for the degree of programming anticipated For example, 2-3 kilobytes is sufficient for storing instructions related to the base made. For higher levels of operation, such as sound synthesis, as much as 32 kilobytes of ROM may be necessary. For controlling driver motor 114 to regulate its speed and direction, a motor driver 112, connects motor 114 and microprocessor 80. Driver motor 112 is a direct current motor which preferably limits the speed of shadow movement to approximately three miles per hour and can move shutter 42 to intermediate positions, if desired. Similarly, lamp 118 is connected to lamp driver 116 for control of lamp 118; lamp driver 116 may be combined with motor driver 112 in a circuit element such as a 74HC7373.

Microprocessor 80 may be connected to a driver 120, such as an RS232 for shifting voltage levels of signals between occupancy simulator units, supervisory systems or other external systems, not shown. Driver 120 may be of the type manufactured by MAXIM designated MAX232. These external systems can be the police or audible alarms and detectors from a home security system, such as door or window opening sensors, glass breakage detectors, motion detectors, and the like.

Microprocessor 80 may be remotely connected to a remote control transmitter 130 when a user wishes to sequence other devices remotely such as lamps, radios, other occupancy simulator units, and the like, by sending a signal by radio wave, infrared, ultrasonic or other wireless signals. In addition to simulating human activity by casting shadows, occupancy simulator unit 10 may also simulate human speech and other household sounds through a speech synthesizer 132 connected to microprocessor 80. Speech synthesis can be accomplished by standard piezoelectric sound simulators.

FIG. 6 illustrates the operation of the occupancy simulator microprocessor 80 using a programming flowchart. Microprocessor 80 generates random time intervals from 15 minutes to one hour and 15 minutes in length. During the interval, in the base mode, microprocessor 80 merely waits for the end of the interval, and lamp 118 and motor 114 are inactive When the time interval ends, lamp 118 and motor 114 are energized and motor 114 begins to move shutter 42 (as shown in FIGS. 1-3) in a first direction. When shutter 42 completes its first pass through the light beam of lamp 118, the first half of the cycle that comprises the base mode is complete.

There then follows a delay to simulate a person who, having then crossed the room, does whatever it may be that prompted him to cross the room. Motor 114 reverses direction and moves shutter 42 in the opposite direction until shutter 42 has returned to where it began. The lamp 118 and motor 114 are deenergized. Microprocessor 80 calculates the next random time interval and waits for that next interval of time to pass. This is the base or level 1 mode of operation. Approximately 10 complete cycles per day is sufficient for simulation of the movement of humans within the hours of dusk to dawn.

Level two, a higher mode of operation, includes the base mode hut with start and stop times for initiating the base mode. The start and stop times are input to microprocessor 80 using SET/RESET and ADVANCE buttons 18,20, respectively (FIG. 1). A first press of the SET/RESET button 18 would allow the user to change, by pressing ADVANCE button 20, the hour for the level 2 mode to begin, a second press would allow the user to set the minutes-past-the-hour for level 2 to begin, again by pressing ADVANCE button 20. A third push of SET/RESET button allows the user to set the hour for level 2 operation to end; the fourth push allows the setting of the minutes-past-the-hour for level 2 to end. A fifth push of the SET/RESET button returns the time of day to the display window.

A level three mode of operation is the programming of microprocessor 80 by an external supervisor, such as the master control of a home security system, through RS 232 driver 120. This would allow greater programming in terms of multiple times on and off per day, sequencing with other units and intermediate settings of the shutters on individual occupation simulator units rather than full, continuous sweeps through the light beams.

A level four mode of operation is the addition of sound syntheses during the base mode of operation. The sounds would not have to comprise a complete, meaningful dialog, for example, but only suggest human speech within human pitch range and at normal human cadences. Other sounds may be suggested by the sound synthesizer could include a barking dog, the opening and closing of doors and refrigerators, flushing toilets, telephone rings, and so on.

A level five mode of operation adds a remote control transmitter so that one occupation simulator unit can sequence another. In other words, a first unit sends a message to a second unit to enter a cycle beginning when the cycle of the first is half complete. The second unit may activate a third which completes both halves of the cycle before signaling the second to that effect. The second then completes its cycle and signals the first which can then complete its cycle. Nesting occupation simulator units allows simulation of realistic movement sequences such as living room to hallway to kitchen and back.

It will be apparent to those skilled in the art of home security from a reading of the foregoing that many changes can be made in the present preferred embodiment without departing from the spirit and scope of the invention, which is to be defined by the appended claims.

What is claimed is:

1. A occupancy simulator for use in a room having walls, said occupancy simulator comprising:
   lamp means for casting a beam of light;
   shutter means in spaced relation to said lamp means for interrupting said light beam and thereby making a shadow; and
   processor means operatively connected to said lamp means and said shutter means for giving directions to said lamp means and shutter means, said shutter means and said lamp means responsive to said directions from said processor means,
   said directions including a base mode wherein said shutter means to interrupt said light beam by passing through said light beam in a first direction and then by passing through said light beam in a different direction so that a shadow is cast on said walls of said room, said shadow moving on said walls in said first direction then said different direction.

2. The occupancy simulator as recited in claim 1, wherein said occupancy simulator further comprises input means for programming additional modes of operation in said processor means and said processor means further comprises memory means for storing said additional modes.

3. The occupancy simulator as recited in claim 2, wherein said base mode includes a delay of said shutter means for a period of time after said shutter means has passed through said light beam in said first direction and before said shutter means has passed through said light beam in said different direction.

4. The occupancy simulator as recited in claim 1, wherein said occupancy simulator further comprises means for starting said base mode at random intervals.

5. The occupancy simulator as recited in claim 2, wherein said occupancy simulator further comprises means for starting said base mode at random intervals.

6. The occupancy simulator as recited in claim 3, wherein said occupancy simulator further comprises means for starting said base mode at random intervals.

7. The occupancy simulator as recited in claim 1, wherein said shutter means further comprises:
   a drive motor; and
   a shutter driven by said drive motor,
   and said different direction is the reverse of said first direction.

8. The occupancy simulator as recited in claim 2, wherein said shutter means further comprises:

a drive motor; and a shutter driven by said drive motor, and said different direction is the reverse of said first direction.

9. The occupancy simulator as recited in claim 3, wherein said shutter means further comprises:

a drive motor; and a shutter driven by said drive motor, and said different direction is the reverse of said first direction.

10. The occupancy simulator as recited in claim 4, wherein said shutter means further comprises:

a drive motor; and a shutter driven by said drive motor, and said different direction is the reverse of said first direction.

11. The occupancy simulator as recited in claim 5, wherein said shutter means further comprises:

a drive motor; and a shutter driven by said drive motor, and said different direction is the reverse of said first direction.

12. The occupancy simulator as recited in claim 6, wherein said shutter means further comprises:

a drive motor; and a shutter driven by said drive motor.

13. An occupancy simulation system comprising: a plurality of occupancy units each having lamp means for casting a light beam, shutter means for interrupting said light beam, motor means for driving said shutter means, and processor means for controlling said lamp means and said shutter means in accordance with a mode of operation, said mode of operation characterized by an interruption of said light beam by said shutter means passing through said light beam in a first direction, said shutter means stopping, then a second interruption of said light beam by said shutter means passing through said light beam in a reverse direction; and supervisor means interconnected to each of said occupancy simulation units for initiating said mode of operation by at least one of said occupancy simulation units.

14. The occupancy simulator system recited in claim 13, wherein said processor means further comprises:

memory means for storing said mode of operation; and input means for modifying said mode of operation, said shutter means responsive to said mode of operation.

15. The occupancy simulator system recited in claim 13, wherein said supervisor is interconnected to a home security system having a plurality of detectors, each of said detector adapted to produce a signal, said supervisor initiating said mode of operation by said at least one of said occupancy simulators in response to said signal.

16. The occupancy simulator system recited in claim 14, wherein said supervisor is interconnector to a home security system having a plurality of detectors, each of said detectors adapted to produce a signal, said supervisor initiating said mode of operation by said at least one of said occupancy simulators in response to said signal.

* * * * *